Figure 3:
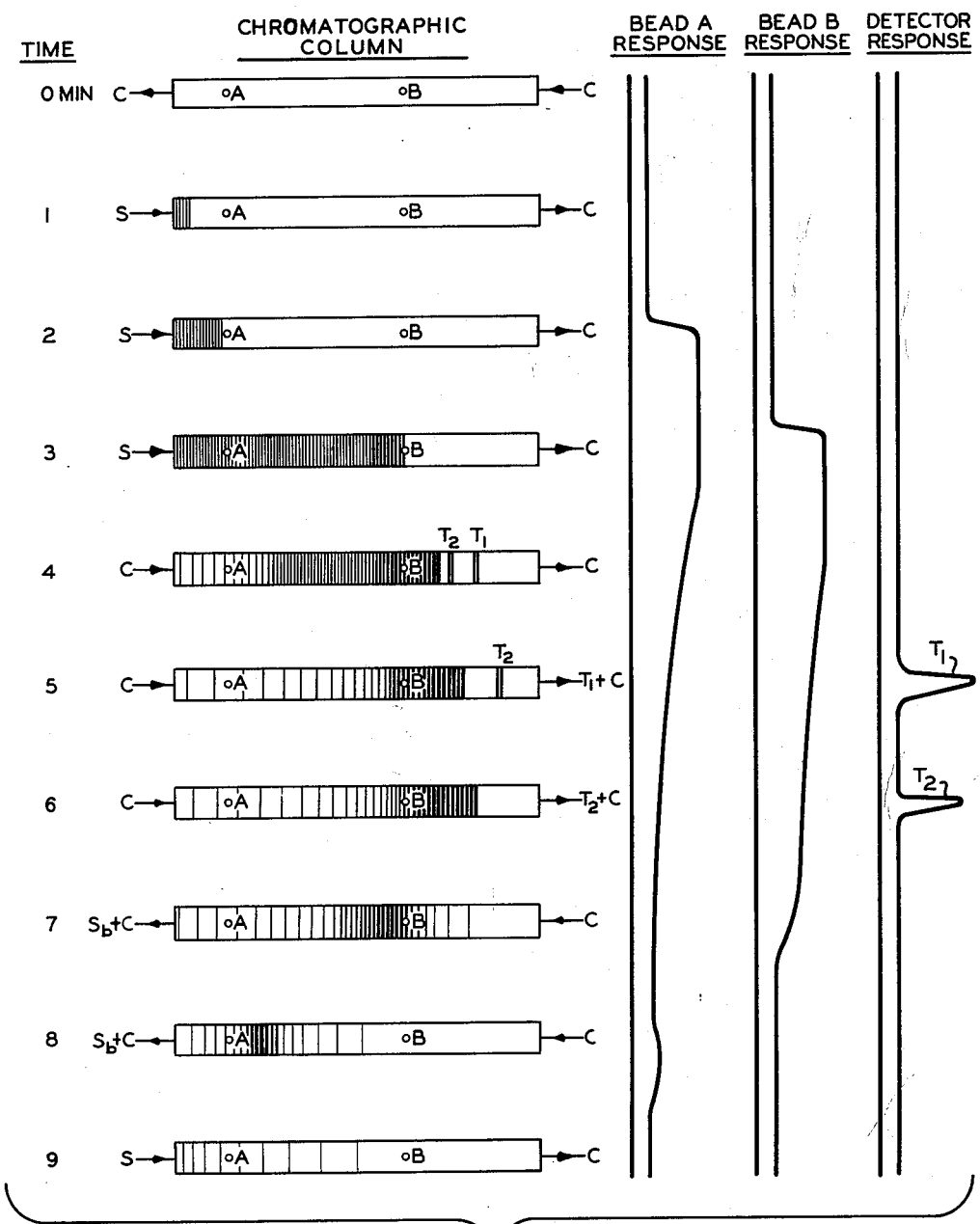

March 31, 1964  R. A. SANFORD  3,126,732
GAS CHROMATOGRAPHIC ANALYSIS OF TRACE MATERIALS
Filed May 9, 1960  2 Sheets-Sheet 1
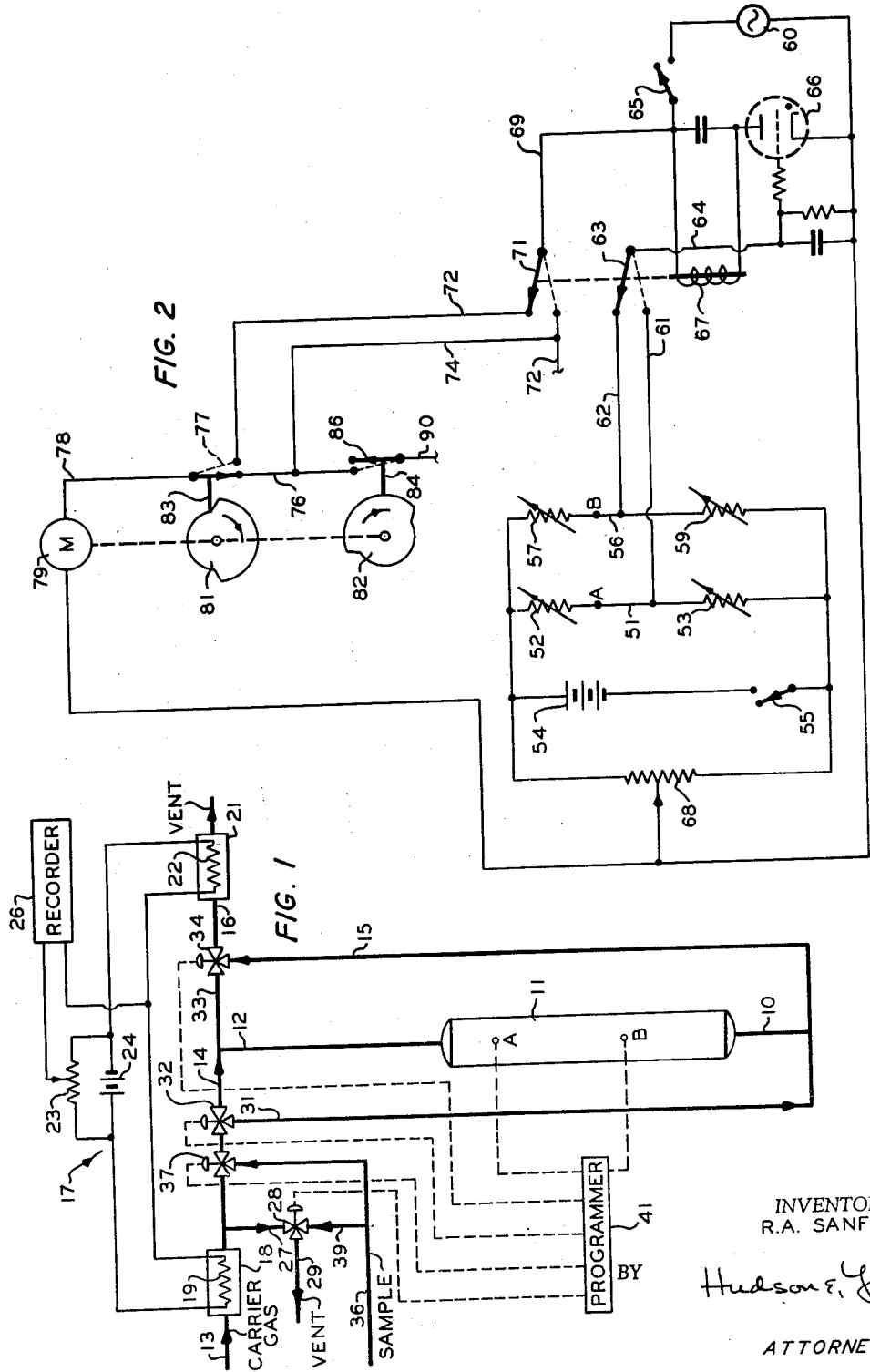
INVENTOR.
R.A. SANFORD
BY Hudson E. Young
ATTORNEYS March 31, 1964     R. A. SANFORD     3,126,732
GAS CHROMATOGRAPHIC ANALYSIS OF TRACE MATERIALS
Filed May 9, 1960     2 Sheets-Sheet 2

INVENTOR.
R. A. SANFORD
BY Hudson & Young
ATTORNEYS

United States Patent Office 3,126,732
Patented Mar. 31, 1964

3,126,732
GAS CHROMATOGRAPHIC ANALYSIS OF TRACE MATERIALS
Richard A. Sanford, Bartlesville, Okla., assignor to Phillips Petroleum Company, a corporation of Delaware
Filed May 9, 1960, Ser. No. 27,678
10 Claims. (Cl. 73—23)

This invention relates to a method and apparatus for gas chromatographic analysis. Particularly, it relates to an improved method and apparatus for analyzing trace components of a fluid mixture by means of gas chromatography.

Gas chromatography has recently received widespread attention and application as an analytical procedure. This method briefly comprises separating the components of a gaseous mixture in a small column packed with certain contact material, the different components of the gaseous mixture having different affinities for the contact material and as a consequence different migration velocities through the column. The separate components appear in the column effluent at different times and their presence in the effluent is detected for purposes of qualitative and quantitative evaluation of the fluid mixture.

There are three common methods or techniques for effecting the quick resolution of samples of gas mixtures in a chromatographic column: the different phases in the column can be contacted or manipulated by frontal analysis, elution analysis, and displacement analysis. While these methods are generally satisfactory in the analysis of major components of gaseous mixtures, present therein in relatively large concentrations, such methods are often unsatisfactory where it is desired to accurately analyze the trace components in a gaseous mixture, present therein in relatively small and difficulty measurable concentrations, due to limitations inherent in these methods of resolution. Such limitations prohibit the ready concentration and/or separation of trace components, especially when the gaseous mixture contains more than one trace component of interest. Such inherent limitations also affect the degree or range of sensitivity of many chromatographic detectors. The accuracy of such methods are generally dependent upon reproducible sample size, thus requiring fixed rates of sample flow for fixed times, such requirements also limiting the applicability of these methods in the area of continuous cyclic sampling and analysis where it is often not possible to maintain such fixed values.

Accordingly, an object of this invention is to provide an improved method and apparatus for gas chromatographic analysis. Another object is to provide an improved method and apparatus for analyzing trace components of a fluid mixture by an improved chromatographic procedure. Another object is to provide an improved method and apparatus for the resolution of fluid mixtures containing trace components of interest. Another object is to accurately analyze the trace components of a fluid mixture. Another object is to effect the ready concentration and separation of trace components in a chromatographic column. Another object is to increase the degree or range of sensitivity and accuracy of detectors used in the chromatographic analysis of trace materials. Another object is to provide a method and apparatus for controlling the amount of sample introduced onto a chromatographic column, and/or the purging of the column, independent of variations in sample flow rate and time and/or purge gas flow rate and time. A further object is to provide an improved method and apparatus for the chromatographic analysis of trace components of a fluid mixture, notwithstanding variable rates and duration of sample flow. Other objects and advantages of this invention will become apparent to those skilled in the art from the following discussion, appended claims, and accompanying drawing in which:

FIGURE 1 schematically illustrates one embodiment of a chromatographic analyzer used in carrying out this invention;

FIGURE 2 schematically illustrates electrical circuitry which can be used in carrying out the subject invention; and FIGURE 3 pictorially illustrates the operation of a chromatographic analyzer according to this invention.

Reference will now be made to the accompanying drawing, and initially to FIGURE 1, for a fuller understanding of the subject invention.

In FIGURE 1, a packed chromatographic column 11, containing suitable packed contact material, is provided with an inlet conduit 12 and an effluent or outlet conduit 10. An inert carrier gas or elutant is supplied via line 13 and this gas can be passed via line 14 to the column inlet line 12 for purposes of elution, said gas passing through the column 11 into effluent line 10, and via lines 15, 16 to vent or other disposal. The chromatographic column is associated with the usual detector generally designated 17, such as a thermal conductivity detector. Detector 17, as shown, comprises a reference channel 18 in carrier gas supply line 13, the reference channel being provided with the usual hot wire or thermistor 19. Detector 17 also is provided with a sensing channel 21 disposed in line 16, the sensing channel also being provided with a hot wire or thermistor 22. Alternatively, sensing channel 21 can be positioned directly in effluent line 10 or line 15. The thermistors 19, 22 of channels 18, 21 are part of a Wheatstone bridge comprising potentiometer 23 and voltage source 24.

Detector 17 compares the thermal conductivities of the fluids flowing through detector channels 18, 21, and voltages respresentative of the detector responses are transmitted to recorder 26, which can comprise a conventional electronic recorder equipped with a strip chart and moving pen for the purpose of graphically recording detector responses in the form of a chromatogram.

Carrier gas supply line 13 can be provided with the usual pressure regulator, needle valve, flow meter, and heater. For the purpose of bypassing the column 11, the carrier gas in line 13 can flow via line 27 and multi-port valve 28 to a suitable vent line 29. The carrier gas can also be passed from line 14 through multi-port valves 37, 32 and via line 31 to the effluent line 10 for purposes of backpurging column 11, the used purge gas then passing via lines 12, 33, multi-port valve 34, and line 16 to vent.

Continuous flow of the gaseous mixture to be sampled is supplied via line 36, valve 37, valve 32, and line 14 to the inlet line 12 of the column 11, eluted sample components and carrier gas being passed from effluent line 10 to vent via line 15, valve 34, and line 16. For the purpose of bypassing the column 11, the flow of gaseous mixture in line 36 can be caused to flow via line 39 and valve 28 to vent line 29. Sample line 36 can also be provided with the usual rate of flow controller, heater, etc.

Multi-port valves 28, 32, 34 and 37 can be of any type known in the art such as three-way solenoid actuated valves, which are operatively connected to and controlled in proper sequence by suitable programmer means or timer 41.

Column 11, according to one embodiment of this invention, is provided with two spaced means, A and B, which function to detect changes in the composition of gas flowing through the column at the loci of said means A and B. Such changes may be changes in thermal conductivity, calorific value, density, ionization energy, etc. A and B are preferably thermistor beads disposed within the packing of column 11 in thermal contact with the gases passing therethrough, said beads A and B detecting changes in the temperature of the column at the loci of the beads. Each of thermistor beads A and B are located in their own circuits having variable resistors or the like which can be adjusted so that their respective circuits do not produce an output voltage which will actuate programmer 41 when thermistors A and B are in thermal contact with only carrier gas. Thermistor A is located within column 11 adjacent the inlet end thereof, and thermistor B is located in column 11 at a point downstream of A and remote from the outlet end of the column.

Alternatively, as will appear hereinafter, the column can be provided with only one means to detect changes in the composition of the gas flowing in the column in contact therewith, e.g., either A or B.

The particular contact material packed within column 11, as well as the carrier gas employed, can vary widely depending upon the type of sample to be analyzed. The contact material can be of the particulate, active, solid adsorbent type, such as silica gel, alumina, charcoal, molecular sieve material (e.g., synthetic zeolites), etc.; or the contact material can be of the partition type comprising a non-volatile liquid, such as high-boiling paraffin, high-molecular weight alcohols and their corresponding esters, etc., coated or impregnated on inert, non-adsorbent, solid particulate material, such as kieselguhr, crushed furnace brick, etc. It is also within the scope of this invention to pack the inlet section of the column 11 with solid adsorbent and the outlet section with partition material, the boundary between the two being in the vicinity of thermistor bead, B.

Conventional carrier gases, such as helium, nitrogen, carbon dioxide, air, etc., can be employed in this invention, the particular carrier gas used depending on the sample under consideration and the means used to detect the sample components. The flow rate of the carrier gas can also vary and generally will be in the range anywhere from 20 to 200 ml. min. during elution and purging, or the rate can be faster during the purging portion of the analysis cycle. It is also within the scope of this invention to employ conventional thermal means associated with the chromatographic column during purging (or elution).

The operation of the apparatus illustrated in FIGURE 1 will now be discussed together with the pictorial views of FIGURE 3, wherein are illustrated the flow of sample through a chromatographic column, together with the responses from thermistor beads A and B and the chromatographic detector responses, during a sampling and analysis cycle at various time intervals.

The column 11 can be prepared in the usual way, care being taken to insure that the location of the thermistor beads A and B are such that they will come into thermal contact with the gases passing through the column. Carrier gas, such as helium, can be passed from its source line 13 and via lines 14, 12 into the column 11, and thence from effluent line 10 to vent via lines 15, 16, the column being brought into equilibrium and the bridge of the detector 17 brought into balance during this period. Alternatively, the carrier gas from supply line 13 can be passed for these purposes via lines 14, 31 and 10 (through column 11) and thence via lines 12, 33 and 16 to vent. Valves 28, 32, 34 and 37 can be automatically set to permit such flow of carrier gas. The condition of the column, and the responses of thermistor beads A and B, and response from detector 17, at this time, zero minutes, being shown at the top of FIGURE 3.

When the column 11 is brought into equilibrium, sample in gaseous form (such as ethylene containing trace components such as carbon monoxide, nitrogen, oxygen, hydrogen, and methane, present as impurities) flows via lines 36, 14 and 12 onto the inlet section of the column 11, the various valves being positioned to permit this flow, during which time carrier gas from supply source 13 is vented via lines 27 and 29. The sample introduced into the column (e.g., at a rate of 50 to 100 cc./min.) displaces some carrier gas therefrom via the outlet line 10, the initial stage of sample flow into the column illustrated in FIGURE 3 at one minute. The sample within the column is concentrated therein in an adsorption zone illustrated by the shaded portion within the column in FIGURE 3. Eventually, after 2 minutes, the front of the adsorption zone reaches thermistor A. Although the temperature of the column at the locus of thermistor A changes at this point, the voltage drop across the circuit containing A is not tapped or transmitted and the positions of the various valves are not altered at this point, for reasons evident hereinafter. The "Bead A Response" output wave, shown at the immediate right of the columns in FIGURE 3, indicates this drop in voltage as a sharp inflection in the output wave. Further continuous introduction of sample into the column causes the front of the adsorption zone to progress toward the outlet end of the column, the concentration of sample in the column increasing with the trace components, because of their relatively lower affinities for the contact material, progressing toward the front of the adsorption zone.

When the front of the adsorption zone reaches a point in the column adjacent B, e.g., after 3 minutes, the temperature of the column at the locus of thermistor B will change sharply, causing the voltage in the circuit of thermistor B to drop, as illustrated by the sharp inflection in the "Bead B Response" output wave. At this point, the sample has become sufficiently concentrated within the column and the trace components will be disposed in close proximity to the front of the adsorption zone. Accordingly, the circuit containing thermistor B will send out or transmit an output voltage to programmer 41, which repositions valves 28 and 37 so that the gaseous mixture from source 36 is vented via lines 39 and 29, and carrier gas from source line 13 is supplied via line 14 to the inlet line 12 of column 11 for purposes of eluting the trace components from the balance of the concentrated sample within the column. The introduction of carrier gas, after 4 minutes, as shown in FIGURE 3, causes trace components $T_1$ and $T_2$ to be eluted at a faster rate than the balance of the sample; trace components $T_1$ and $T_2$ eventually break away from the front of the adsorption zone. Continued introduction of carrier gas into the inlet end of the column first causes trace component $T_1$ to appear, after 5 minutes, in the column effluent line 10 and sensing channel 21, with the result that a peak representative of the concentration of component $T_1$ is generated from the detector and recorded by recorder 26, this peak being illustrated in the chromatogram of FIGURE 3 designated "Detector Response." The second trace component $T_2$, having a somewhat greater affinity for the contact material in the column than that of $T_1$, although much less affinity than that of the major or other components of the sample, subsequently appears, after 6 minutes, in the effluent line 10 and sensing channel 21, the peak of component B being recorded by recorder 26 and shown in the chromatogram in FIGURE 3. Subsequent trace components of interest having relatively greater affinity for the contact material, that is, a somewhat lower migration velocity through the column than the other eluted trace components, also become separated and appear in the column effluent, although in the interest of brevity only two trace components are shown in FIGURE 3. Trace components which can be thus detected according to my invention can be present in the gaseous sample in very small amounts, e.g., .0005 to 200 parts per million, depending on detector sensitivity and sample size.

Referring again to the point in the sampling portion of the cycle when the front of the adsorption zone reaches thermistor bead B, the output voltage from its circuit also causes programmer 41 to set in operation a suitable timer mechanism or the like so that the duration of elution of the concentrated sample by means of the carrier gas can be controlled, based on past experience or calibration runs, the elution being carried out only long enough to cause the elution of the trace components of interest and their detection by the chromatographic detector. That is, the elution is of such duration that only the trace components of interest appear in the column effluent and are detected, the elution being terminated before major components in the balance of the concentrated sample are eluted and appear in the column effluent. As such the outlet portion of the column is relatively free of concentrated sample at the end of the elution period, the front of the adsorption zone being remote from the column outlet end.

After detection of the trace components of interest, programmer 41 actuates valves 32 and 34 so as to permit carrier gas from supply line 13 to flow via lines 14 and 31 into the effluent line 10 and through the column 11 for purposes of back-purging the column, i.e., to displace substantially the balance of the sample remaining in the column and return the latter to equilibrium and place it in condition for another sample and analysis cycle. This operation is pictorially illustrated during 7 and 8 minutes of operation in FIGURE 3. The used purge gas, together with the balance of the sample, flows via lines 12, 33, and 16 to vent. The end of the purging portion of the cycle is preferably controlled by an output voltage when the temperature of the column at the locus of thermistor A indicates sufficient purging to allow sorption of the next sample on the column. Complete purging of the balance of the sample from the column is not necessary since the residual amount of sample in the column will be reproducible during each cycle. When the thermistor A indicates substantially complete or sufficient purging, the output voltage therefrom is transmitted to programmer 41 which accordingly repositions valves 28, 37, 32 and 34 to begin another sample cycle: sample flowing from source line 36 to the inlet end of column 11 via lines 14 and 12, the displaced carrier gas from column 11 flowing via effluent line 10 to vent via lines 15, 16, and carrier gas from supply line 13 being passed to vent via lines 27, 29. Beginning of another sample cycle is illustrated in FIGURE 3 at the end of 9 minutes.

Although the foregoing discussion was illustrated as applied to conditions where the thermal conductivity of the carrier gas is greater than that of the sample gas, it is evident that this could be reversed, i.e., the thermal conductivity of the sample gas could be greater than that of the carrier gas; in either case, the sequence of operations described would be the same.

It should be understood that the duration of the total cycle and various time intervals between the steps in each cycle are not to be narrowly construed as limited to those described above or illustrated in FIGURE 3 for illustrative purposes. The sample time interval will depend on the flow rate of the sample from its source, and the sample time can be reduced by using a high sample flow rate. Generally, it is preferred to have the purge time about 5 to 10 times that of the elution time interval, and these time intervals will also depend on the flow rate of the carrier gas.

As mentioned hereinbefore, it is within the scope of this invention to place only one thermistor bead, i.e., either A or B, in the column. For example, a column could be provided with just bead A for the said purpose of controlling the purge interval, and using some other means for flowing a sufficient amount of sample onto the column, such as a flow meter in the sample source line which would indicate when sufficient sample was concentrated in the column, after which the programmer would initiate and terminate the elution interval and then initiate the purge interval. Or, a column could be provided with just bead B for the said purposes of indicating when sufficient sample was concentrated in the column and initiating the elution interval, and using some other means such a timer to indicate when the column has been sufficiently purged.

Reference now will be made to FIGURE 2 which schematically illustrates electrical circuitry which can be used in automatically controlling the flow of the various fluids of FIGURE 1.

In FIGURE 2, thermistor A is illustrated as part of circuit 51 having variable resistors 52, 53, this circuit being supplied with voltage from source 54 (which can be any stable D.C. power supply) when switch 55 is closed. Thermistor B is similarly illustrated as part of a circuit 56 having variable resistors 57, 59, this circuit also being supplied with voltage from source 54 when switch 55 is closed. The circuit 51 of thermistor A and the circuit 56 of thermitsor B are connected by conductors 61, 62, respectively, to a two-position switch 63, which is in turn connected by conductor 64 to the grid of a gas-filled switch or thyratron tube 66, the latter being operatively connected to solenoid relay 67. Potential from A.C. source 60 is applied across thyratron tube 66 when switch 65 is closed. Variable resistors 52, 53, 57 and 59 can be adjusted so as to control the temperature of the thermistors A and B which will cause circuits 51, 56 to deliver the required output potential to fire the thyratron tube 66. Potentiometer 68, connected across battery 54, can be used to adjust the bias between the grid and cathode of the thyratron tube 66. The firing of the thyratron tube 66 energizes solenoid relay 67 which is operatively connected to two-position switches 71 and 63. Associated with switch 71 is a contact 72 which is operatively connected to valves 28 and 37. Potential from conductor 69 is transmitted by switch 71 to conductor 74 when solenoid relay 67 is energized. With switch 71 in the position shown by the broken line potential is transmitted from conductor 69 through conductor 74, conductor 76, switch 77 and conductor 78 to timer motor 79, controlling the operation thereof. Motor 79 is operatively connected to cams 81, 82, controlling the rotation thereof in the direction indicated in FIGURE 2. Cam 81 is provided with a cam follower 83 associated with switch 77 and cam 82 is provided with a cam follower 84 associated with switch 86, the latter being operatively connected to valves 34, 32, through conductor 90, to control the operation thereof.

In the operation of the circuitry shown in FIGURE 2, at the beginning of a cycle, switches 55 and 65 are closed, and valves 28, 32, 34 and 37 of FIGURE 1 are initially positioned so as to vent the carrier gas via line 29, permit flow of sample onto the column, and permit effluent therefrom to pass to vent via lines 10, 15 and 16. When the front of the sample adsorption zone in the packed column reaches thermistor A, the potential drop across circuit 51 is charged, but because switch 63 is in the position shown this potential drop is not transmitted from conductor 61 to conductor 64.

When the front of the adsorption zone in the packed column reaches thermistor B, the potential drop across circuit 56 is transmitted by conductor 62, switch 63, and conductor 64 to the grid of thyratron tube 66, causing the latter to fire and energize solenoid relay 67. Actuation of the latter moves switches 63 and 71 to the positions shown by the broken lines. With switch 71 in its new position, current from source 60 is supplied by conductor 72 to reposition valves 28 and 37, causing sample to be vented via line 29 and carrier gas to flow onto the column via lines 14, 12. Simultaneously with this repositioning of valves 28 and 37, current is supplied by conductors 74, 76, switch 77 and conductor 78 to motor 79, starting the latter and rotating cams 81, 82.

Elution continues until cam follower 84 drops, causing switch 86 to move to the position shown by the broken line; as a result, current from source 60 is supplied by conductors 74, 90 to reposition valves 32, 34. As a result, elution of the packed column is stopped and carrier gas is supplied via lines 31, 10 to back-purge column 11, the used purge gas flowing to vent via lines 12, 33, and 16 (sample during back-purge still being vented via lines 39, 29).

Near the end of the purging of the column, cam 81 moves cam follower 83 to cause switch 77 to move to the broken position; as a result, current is no longer applied to motor 79 and it stops. Back-purging continues until the thermal conductivity across thermistor A increases (due to a low amount of residual sample in the vicinity of thermistor A); as a result the resistance across circuit 51 increases to bias the grid of thyratron tube 66 to cutoff, thus causing solenoid relay 67 to de-energize and allow switches 63, 71 to move to their original positions as shown. Current is no longer supplied by conductor 72 to valves 28, 37 and they return to their original positions to permit flow of another sample onto the column. However, current is now supplied to motor 79 by conductor 73, switch 77, and conductor 78. This motor is shut off when cam follower 83 moves to the position shown, permitting switch 77 to drop to the position shown. Thus, the cycle is completed and a new cycle begun.

Various modifications and alterations of this invention will become apparent to those skilled in the art from the foregoing discussion and accompanying drawing and it should be understood that the subject invention is not to be unduly limited to that set forth in this application for illustrative purposes.

I claim:

1. A method of analyzing a gaseous mixture, comprising detecting changes in the composition of the gas flowing through a packed chromatographic column at least at one point therein intermediate the inlet and outlet ends of said column, flowing a stream consisting of said gaseous mixture onto said packed chromatographic column via the inlet end thereof until a predetermined amount of said gaseous mixture has been concentrated in said column in an adsorption zone, terminating said flow of gaseous mixture when said amount has been thus concentrated in said column, flowing an eluting gas into said column via the inlet end thereof to elute and separate at least one trace component from said adsorption zone, detecting the presence of said separated trace component in the effluent of said column, flowing purge gas into said column to substantially purge the balance of the gaseous mixture from said column, terminating said flow of purge gas when said balance of gaseous mixture has been thus purged from said column, and automatically in accordance with said detected changes controlling at least one of said steps of terminating the flow of said gaseous mixture into said column and terminating the flow of said purge gas into said column.

2. A method of chromatographically analyzing a gaseous mixture by means of a packed chromatographic column, comprising detecting changes in the temperature of said column at least at one point therein intermediate the inlet and outlet ends of said column, flowing a stream consisting of said gaseous mixture onto said column via the inlet end thereof until a predetermined amount of said gaseous mixture has been concentrated in said column in an adsorption zone the front of which is located in said column at a point remote from the outlet end of said column, terminating said flow of gaseous mixture when said amount has been thus concentrated in said column, flowing an eluting gas into said column via the inlet end thereof to elute and separate at least one trace component from the front of said adsorption zone, detecting the presence of said separated trace component in the effluent of said column, flowing purge gas into the outlet end of said column to substantially purge the balance of the gaseous mixture from said column, terminating said flow of purge gas when said balance of gaseous material has been thus purged from said column, and automatically in accordance with said detected changes in temperature controlling at least one of said steps of flowing said gaseous mixture onto said column and flowing purge gas into said column so as to terminate the former step when said predetermined amount of said gaseous mixture has been concentrated in said column and terminate the latter step when said column has been sufficiently purged.

3. The method according to claim 2 wherein said point in said column where changes in temperature are detected is located in the outlet half of said column remote from the outlet end thereof, and said detected changes in temperature are used to terminate the flow of said gaseous mixture onto said column when said predetermined amount of said gaseous mixture has been concentrated therein.

4. The method according to claim 2 wherein said point in said column where changes in temperature are detected is located in the inlet half of said column near the inlet end thereof, and said detected changes in temperature are used to terminate the flow of said purge gas into said column.

5. The method according to claim 2 wherein said changes in temperature are detected at two points in said column: a first point located in the outlet half of said column remote from the outlet end thereof, said changes in temperature adjacent said first point used to terminate the flow of said gaseous mixture onto said column; and a second point located in the inlet half of said column near the inlet end thereof, said changes in temperature adjacent said second point used to terminate the flow of purge gas into said column.

6. In a chromatographic analyzer comprising a packed chromatographic column, inlet means to introduce gas into the inlet end of said column, outlet means to withdraw gas from the outlet end of said column, means for detecting changes in the composition of the gas flowing through said column at least at one point therein intermediate the inlet and outlet ends of said column, first conduit means for flowing a stream consisting of a gaseous mixture onto said column via said inlet means, second conduit means for flowing an eluting gas into said column via said inlet means, third conduit means for flowing a purge gas into said column, means for detecting the presence of at least one component of said gaseous mixture in said outlet means, and means operatively connected to said means for detecting changes and at least one of said conduit means, whereby said detected changes are used to automatically control at least one of said conduit means to terminate the flow of said gaseous mixture onto said column when a predetermined amount of said gaseous mixture is concentrated therein, and terminate the flow of said purge gas into said column when the same is substantially purged.

7. In a chromatographic analyzer comprising a packed chromatographic column, inlet means to introduce gas into the inlet end of said column, outlet means to withdraw gas from the outlet end of said column, means for detecting changes in temperature of the gas flowing through said column at least at one point therein intermediate the inlet and outlet ends of said column, first conduit means for flowing a stream consisting of a gaseous mixture onto said column via said inlet means, second conduit means for flowing an eluting gas into said column via said inlet means, third conduit means for flowing a purge gas into said column via said outlet means, means for detecting the presence of at least one component of said gaseous mixture in said outlet means, and means operatively connected to said means for detecting changes and at least one of said conduit means, whereby said detected changes are used to automatically control at least one of said conduit means to terminate the flow of said gaseous mixture onto said column when a predetermined amount of said gaseous mixture is concentrated therein, and terminate the flow of said purge gas into said column when the same is substantially purged.

8. Apparatus according to claim 7 wherein said means for detecting changes in temperature is located in the outlet half of said column remote from the outlet end thereof and said detected changes in temperature are used to terminate the flow of said gaseous mixture onto said column when said predetermined amount of said gaseous mixture has been concentrated therein.

9. Apparatus according to claim 7 wherein said means for detecting changes in temperature is located in the inlet half of said column near the inlet end thereof, and said detected changes in temperature are used to terminate the flow of said purge gas into said column.

10. Apparatus according to claim 7 wherein said means for detecting changes in temperature comprises two such means located at two different points in said column: a first point located in the outlet half of said column remote from the outlet end thereof, said changes in temperature adjacent said first point used to terminate the flow of said gaseous mixture onto said column; and a second point located in the inlet half of said column near the inlet end thereof, said changes in temperature adjacent said second point used to terminate the flow of purge gas into said column.

References Cited in the file of this patent

UNITED STATES PATENTS

| 2,868,011 | Coggeshall | Jan. 13, 1959 |
| 2,964,938 | Fuller | Dec. 20, 1960 |
| 2,981,092 | Marks | Apr. 25, 1961 |

FOREIGN PATENTS

| 822,432 | Great Britain | Oct. 28, 1959 |

OTHER REFERENCES

Vapour Phase Chromatography, by D. H. Desty, from Symposium on Mayzo, June 1, 1956, published in London, 1957.

Analytical Chemistry article by Lichtenfels et al., vol. 28, September 1956.

Oil and Gas Journal, "Gas Chromatography," article Dec. 17, 1956.